United States Patent
Hiremath et al.

(10) Patent No.: US 8,321,626 B2
(45) Date of Patent: Nov. 27, 2012

(54) MANAGEMENT OF CONFIGURATION DATA USING PERSISTENT MEMORIES REQUIRING BLOCK-WISE ERASE BEFORE REWRITING

(75) Inventors: Indudharswamy G Hiremath, Bangalore (IN); Daniel Jonathan Kurtz, Sunnyvale, CA (US); Sibasis Purohit, Bangalore (IN); Vishal Batra, Bangalore (IN)

(73) Assignee: Gainspan Corporation, San Jose, CA (US)

( * ) Notice: Subject to any disclaimer, the term of this patent is extended or adjusted under 35 U.S.C. 154(b) by 377 days.

(21) Appl. No.: 12/750,724

(22) Filed: Mar. 31, 2010

(65) Prior Publication Data

US 2011/0246702 A1   Oct. 6, 2011

(51) Int. Cl.
*G06F 12/00* (2006.01)
(52) U.S. Cl. ............................................ 711/103; 713/1
(58) Field of Classification Search .......................... None
See application file for complete search history.

(56) References Cited

U.S. PATENT DOCUMENTS

| | | | |
|---|---|---|---|
| 6,230,319 B1 | 5/2001 | Britt, Jr. et al. | |
| 6,414,871 B1 | 7/2002 | Wirtz, II et al. | |
| 6,598,114 B2* | 7/2003 | Funakoshi | 711/103 |
| 7,047,352 B1* | 5/2006 | Khu et al. | 711/103 |
| 7,284,085 B2 | 10/2007 | Netter et al. | |
| 7,298,825 B2 | 11/2007 | Omernick et al. | |
| 7,610,436 B2* | 10/2009 | Nakano | 711/103 |
| 2004/0186975 A1* | 9/2004 | Saha | 711/170 |
| 2004/0215948 A1* | 10/2004 | Abbey et al. | 713/1 |
| 2005/0132178 A1 | 6/2005 | Balasubramanian | |
| 2005/0138271 A1* | 6/2005 | Bernstein et al. | 711/103 |
| 2005/0278523 A1 | 12/2005 | Fortin et al. | |
| 2009/0196102 A1 | 8/2009 | Kim | |
| 2011/0185113 A1* | 7/2011 | Goss et al. | 711/103 |

FOREIGN PATENT DOCUMENTS

EP        2012465 A1    1/2009

* cited by examiner

*Primary Examiner* — Kaushikkumar Patel
(74) *Attorney, Agent, or Firm* — Narendra Reddy Thappeta

(57) ABSTRACT

According to an aspect, the values corresponding to each group of parameters are stored in successive memory locations of a set of blocks, and pointer locations are maintained to point to the area where the groups of values are stored. When a new value is received for a parameter of a group, the values of parameters (with the new value substituted for the corresponding old value) of the group are replicated to a new set of locations in the same set of blocks if sufficient number of successive unwritten memory locations are available. A pointer data from the prior set of locations to the new set of locations is also maintained. According to another aspect, when there is insufficient space for the replication, all the present valid values of all groups are first written to a new set of blocks, and then only the earlier set of blocks are erased.

18 Claims, 5 Drawing Sheets

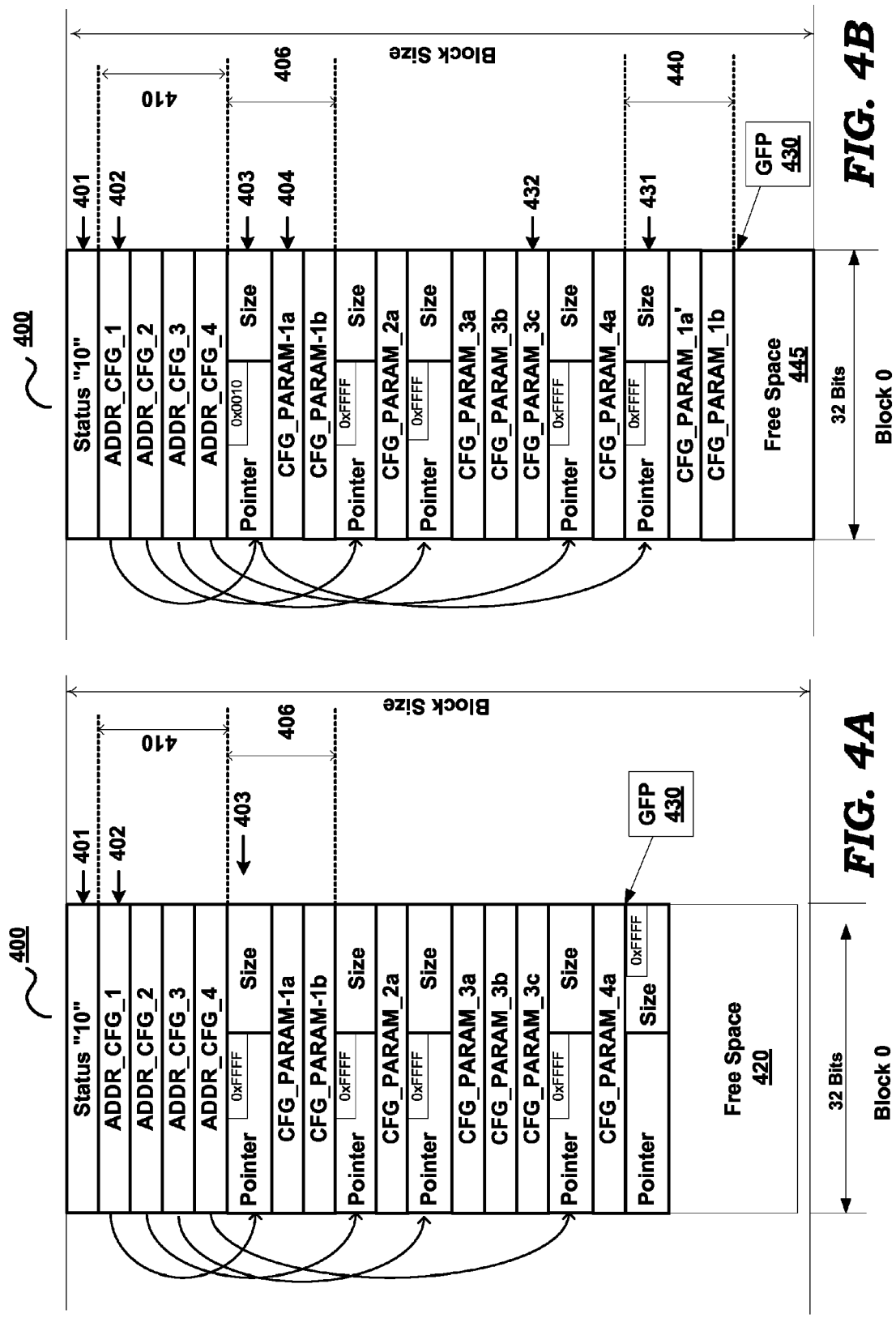

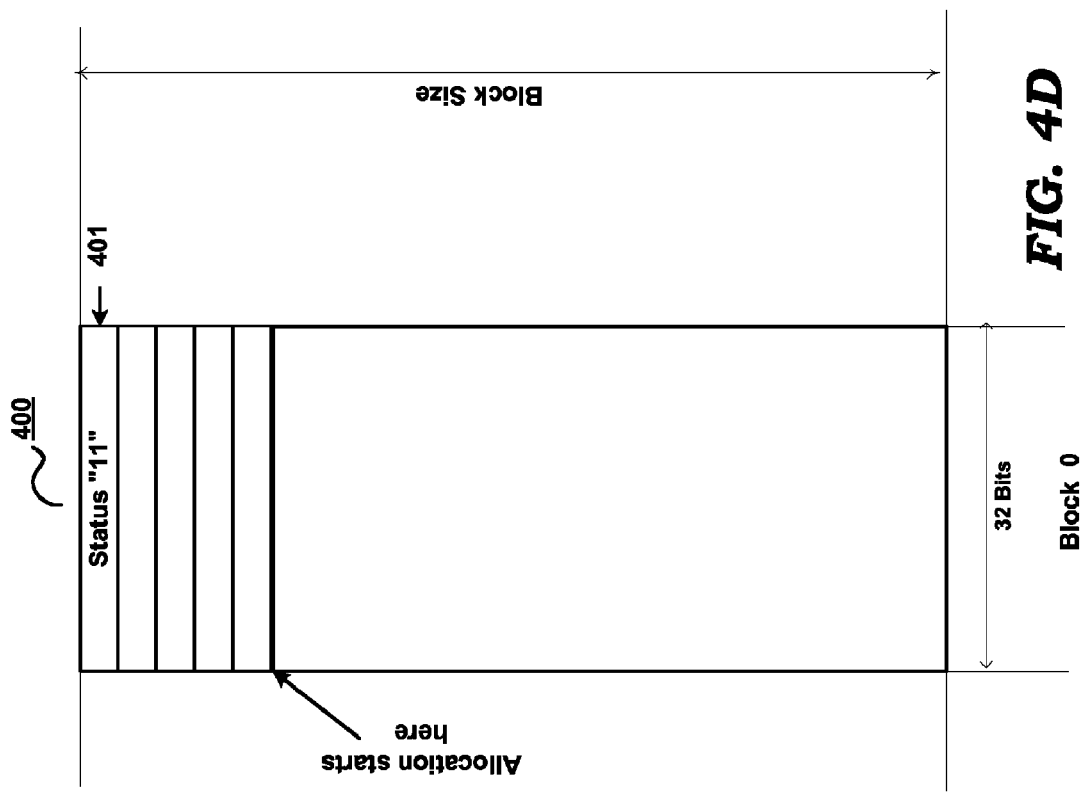
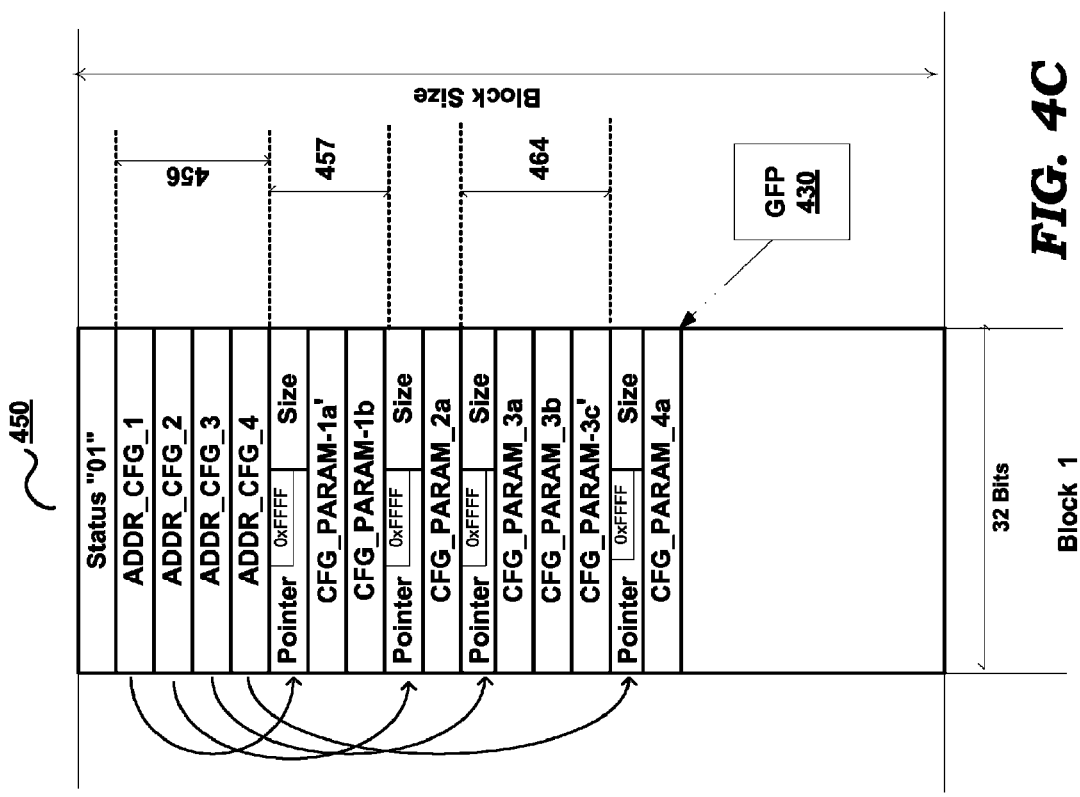
FIG. 4C
FIG. 4D

MANAGEMENT OF CONFIGURATION DATA USING PERSISTENT MEMORIES REQUIRING BLOCK-WISE ERASE BEFORE REWRITING

BACKGROUND OF THE INVENTION

1. Technical Field

Embodiments of the present disclosure relate generally to management of configuration data, and more specifically to storage and management of configuration data in persistent memories such as flash memories requiring block-wise erase before rewriting.

2. Related Art

Configuration generally refers to setting parameters controlling the operation of a device or a system to corresponding values to cause the device/system to operate in a desired manner. The values associated (according to any pre-specified convention) with parameters together are termed as configuration data, which controls the corresponding aspects of operation of the device/system. For example, in the context of a sensor network, the frequency of measurement of temperature, pressure, etc., may be specified by corresponding configuration data, and the corresponding information may be polled based on the value specified for the frequency parameter.

Configuration data may be stored in a persistent (i.e., non-volatile) memory prior to being provided to the corresponding device or system to be configured, for example, prior to initialization of the device/system. Thus, users or administrators typically set the parameters to corresponding values prior to initialization to control the operation of the device/system. Further, the configuration data may be updated from time to time (either by user action or by the operation of corresponding program logic due to various operating conditions) based on the specific requirements of the operating environment. Operations such as the storing and updating are together referred to as managing the configuration data.

There are several types of persistent memories, which require memory locations to be erased once written to, before another write to the same memory locations can be performed. Further, the erasure may be possible only block-wise, i.e., for an entire chunk (set of contiguous memory locations termed as a block). An example of such a memory device is flash memory. As is well known in the relevant arts, flash memory is a non-volatile storage component, which can be electrically erased and rewritten to (re-programmed). Erasure may need to be performed in a block-wise fashion, i.e., for an entire block at a time (rather than per memory location) before any memory location in the block is rewritten.

Several aspects of the present invention are related to management of configuration data in such memories.

BRIEF DESCRIPTION OF THE VIEWS OF DRAWINGS

Example embodiments of the present invention will be described with reference to the accompanying drawings briefly described below.

FIG. 4A depicts the contents of a block after storing configuration data in the form of multiple groups in an embodiment.

FIG. 4B depicts the content of the block of FIG. 4A after the value of one parameter of a block is changed.

FIG. 4C depicts the content of a new block after there is insufficient memory space to store changed values in the block of FIG. 4B.

FIG. 4D depicts the content of the block of FIG. 4B after being erased and available for rewriting of any locations for the management of configuration data.

The drawing in which an element first appears is indicated by the leftmost digit(s) in the corresponding reference number.

DETAILED DESCRIPTION

1. Overview

According to an aspect of the present invention, the values corresponding to each group of parameters are stored in successive memory locations of a set of (one or more) blocks, and pointer locations are maintained to point to the area (forming locations) where the values of corresponding groups are stored. When a new value is received for a parameter of a group, the values of parameters (with the new value substituted for the corresponding old value) of the group are stored in a new set of locations in the same set of blocks if sufficient number of successive unwritten memory locations are available. A pointer data from the prior set of locations to the new set of locations is also maintained. In an embodiment, the pointer data and the pointer locations are within the same set of blocks.

According to another aspect of the present invention, when there is insufficient space for a new set of locations (during an update operation), all the present values (including any value received in a latest update operation) of all elements of the group are first written to a new set of blocks, and then only the earlier set of blocks are erased. By not erasing until completion of copying, any recovery needed in situations such as power failure, may be easily accomplished.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
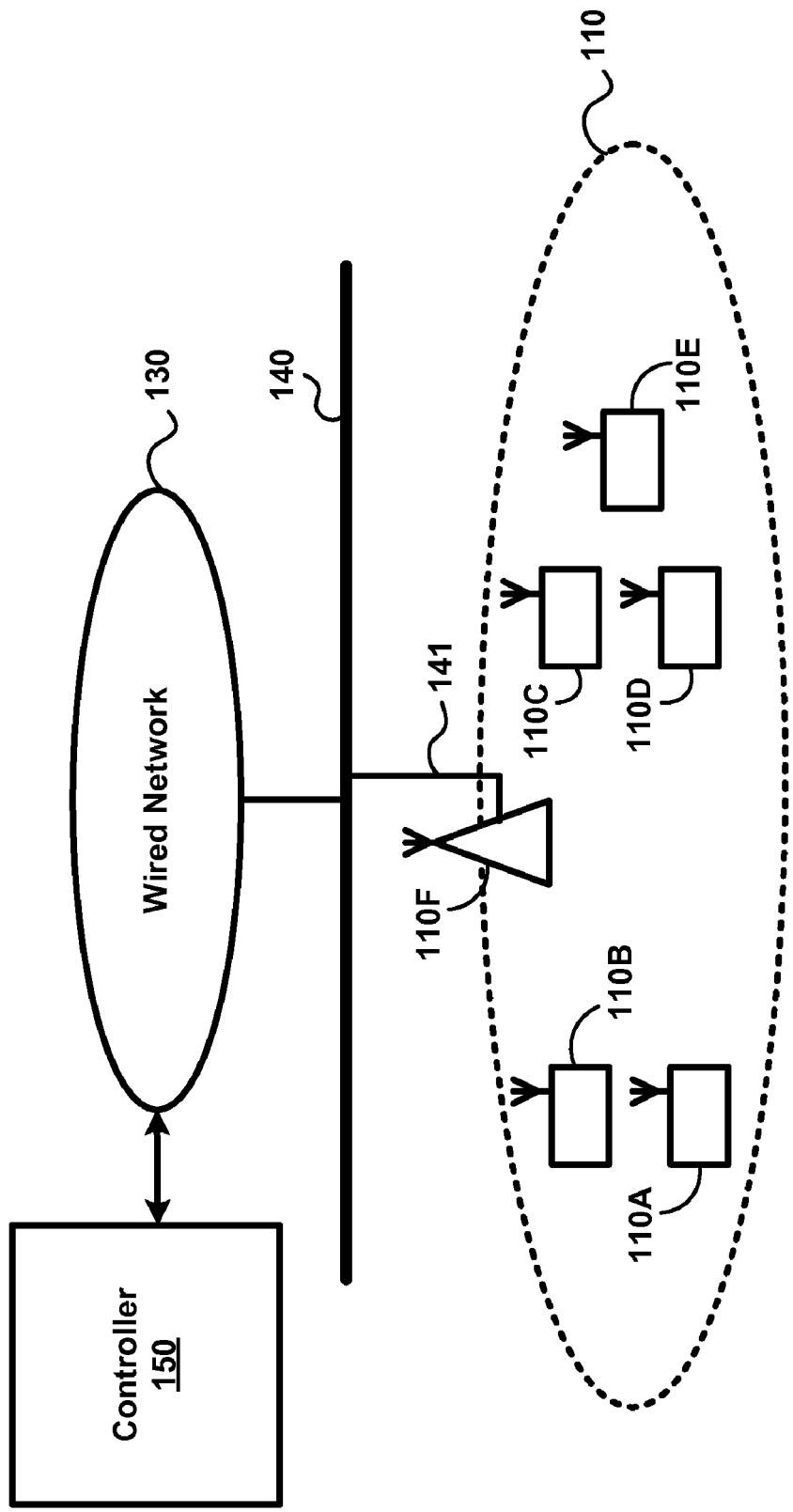
FIG. 1 is a block diagram of an example environment in which several features of the present invention can be implemented.

FIG. 1 is a block diagram illustrating an example environment (e.g., a manufacturing plant, or a building) in which several features of the present invention may be implemented. The example environment is shown containing only representative systems for illustration. However, real-world environments may contain many more systems/components as will be apparent to one skilled in the relevant arts.

Further, in the description below, the components and the environment are described as operating consistent with IEEE 802.11 standard, merely for illustration Implementations in other environments are also contemplated to be within the scope and spirit of various aspects of the present invention. The computing system is shown containing sensor devices 110A-110E, access point (AP) 110F, wired network 130, wired network backbone 140 and controller 150. Block 110 represents a basic service set (BSS) consistent with the 802.11 standard.

AP 110F is connected by a wired medium (141) to wired network backbone 140 and thus to wired network 130, and controller 150. Each of sensor devices 110A-110E may communicate with AP 110F (as well as with each other) wirelessly according to IEEE 802.11, and thereby with wired network 130 and controller 150.

Controller 150 may send commands to and receive measurement data from one or more of sensor devices 110A-110E, and operates to provide desired features such as building or plant automation, based on the specific environment in which the components of FIG. 1 are deployed. Controller 150 may also generate configuration data for use in sensor devices 110A-110E, and provide the configuration data to the devices via corresponding wired and wireless paths shown in FIG. 1.

Each of sensor devices 110A-110E generates one or more measurements representing states of interest such as temperature, pressure, humidity, motion, etc, and provides the measurements to controller 150 via AP 110F and wired network 130. The configuration data controls the various operations of the wireless device may include network-related data (for example, SSID, channel, security password of access point (AP), network address/IP address of controller 150), measurement-related data (such as the rate at which measurement values are to be transmitted to controller 150), power management related configuration data (for example, value of battery voltage at which to send a 'battery low' alarm to controller 150), etc. As noted above, the configuration data contains several parameters, with each parameter having an associated value.

The manner in which such configuration data is managed according to several aspects of the present invention, is described below with examples. The details of a sensor device, in an embodiment, are described first.

3. Sensor Device

Figure 2:
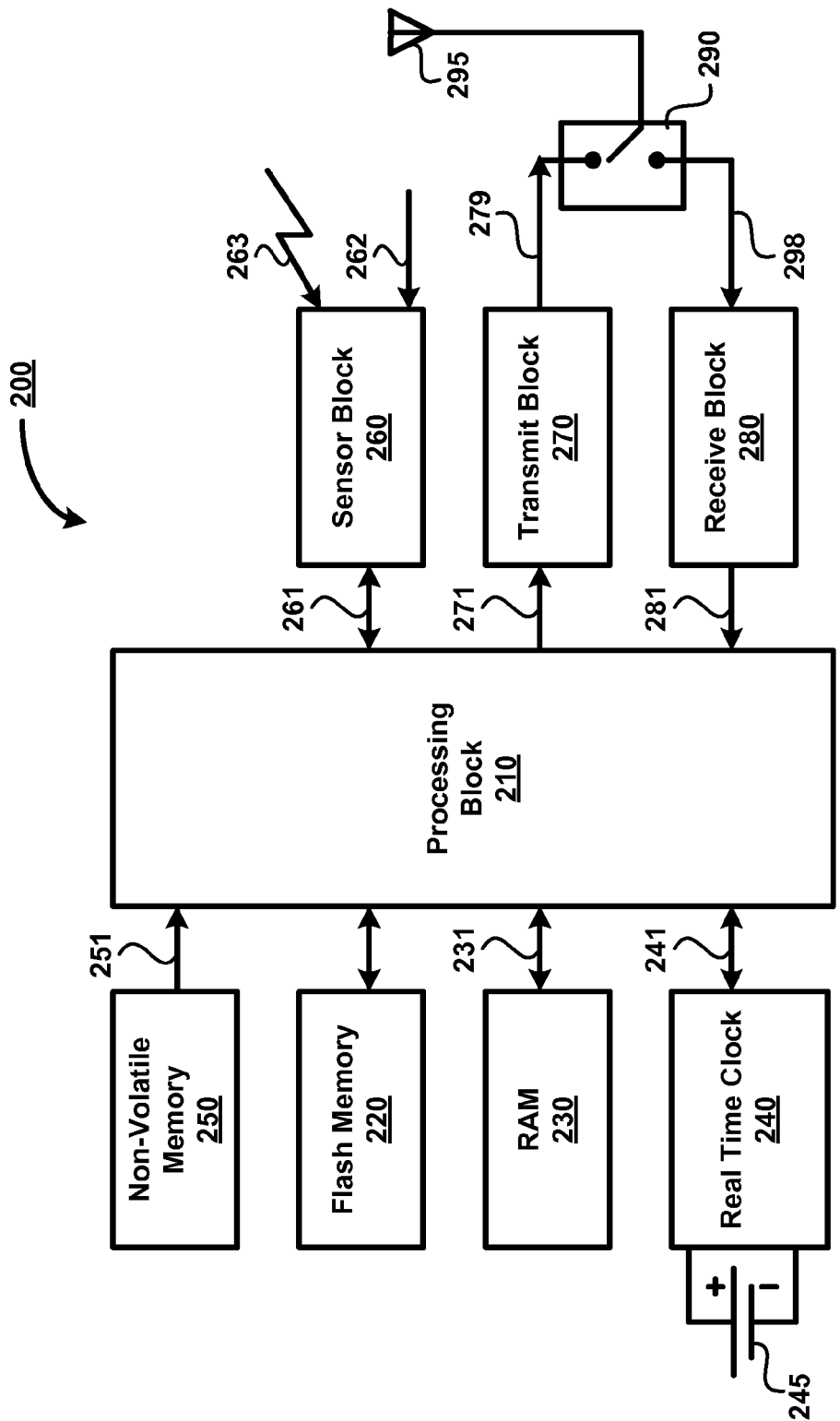
FIG. 2 is a block diagram of an example device in which several features of the present invention are implemented.

FIG. 2 is a block diagram of the internal details of a wireless device in an embodiment. The wireless device may correspond to AP 110F or sensors 110A-110E, though the description below is provided with respect to sensors merely for conciseness. It should be however understood that features can be implemented in other devices (not based on wireless technology), as will be apparent to one skilled in the relevant arts by reading the disclosure provided herein.

Sensor device 200 is shown containing processing block 210, flash memory 220, random access memory (RAM) 230, real-time clock (RTC) 240, battery 245, non-volatile memory 250, sensor block 260, transmit block 270, receive block 280, switch 290 and antenna 295. The whole of sensor device 200 may be implemented as a system-on-chip (SoC), except for battery 245. Alternatively, the blocks of FIG. 2 may be implemented on separate integrated circuits (IC).

Again, the components/blocks of sensor device 200 are shown merely by way of illustration. However, sensor device 200 may contain more or fewer components/blocks. Further, although not shown in FIG. 2, all blocks of sensor devices may be connected automatically to an auxiliary power source (such as battery 245) in the event of failure of the main power source.

Sensor block 260 may contain one or more sensors, as well as corresponding signal conditioning circuitry, and provides on path 261 measurements/values of physical quantities such as temperature, pressure, etc. (sensed via wired path 262 or wireless path 263).

Antenna 295 operates to receive from and transmit to a wireless medium, corresponding wireless signals containing data. Switch 290 may be controlled by processing block 210 (connection not shown) to connect antenna 295 either to receive block 280 via path 298, or to transmit block 270 via path 279, depending on whether sensor device is to receive or transmit.

Transmit block 270 receives data to be transmitted on path 271 from processing block 210, generates a modulated radio frequency (RF) signal according to IEEE 802.11 standards, and transmits the RF frequency signal via switch 290 and antenna 295. Receive block 280 receives an RF signal bearing data via switch 290 and antenna 295, demodulates the RF signal, and provides the extracted data to processing block 210 on path 281.

RTC 240 operates as a clock, and provides the 'current' time to processing block 210 on path 241. RTC 240 may be backed-up by battery 245 (in addition to the normal source of power, not shown in the Figure). RTC 240 may also contain memory to store critical information from time to time by processing block 210 in RTC 240. Although not shown as such in FIG. 2, battery 245 may also be used as back-up power to one or more of the other components/blocks of sensor device 200. Thus, for example, the power supply to flash memory 220 may be automatically switched (by corresponding circuitry not shown) to battery 245 in case of failure of the main power source (not shown).

Flash memory 220 represents an example memory, which contains memory locations organized as blocks. A block represents a set of memory locations (typically contiguous in terms of memory address), which are to be all erased before data can be rewritten into any location (in particular a bit location). Thus, the memory is characterized in that the data can be written only once, and rewriting requires all the locations of the block to be erased (prior to rewriting).

Non-volatile memory 250 stores instructions, which when retrieved into RAM 230 and executed by processing block 210, causes device 200 to provide several desired features. For example, in the context of wireless sensor networks used for building or plant automation, processing block 210 may process and transmit measurement data such as temperature, pressure etc., obtained from sensor block 260. Processing block 210 may contain multiple processing units internally, with each processing unit potentially being designed for a specific task. Alternatively, processing block 210 may contain only a single general-purpose processing unit.

RAM 230 and non-volatile memory 250 (which may be implemented in the form of read-only memory/ROM) constitute computer program products or machine/computer readable medium, which are means for providing instructions to processing block 210. Thus, such medium can be in the form of removable (floppy, CDs, tape, etc.) or non-removable (hard drive, etc.) medium. Processing block 210 may retrieve the instructions (via corresponding paths 251 and 231), and execute the instructions to provide several features of the present invention (related to management of configuration data), as described below. It should be appreciated that the processors can retrieve the instructions from any randomly accessible storage units (e.g., RAM 230 or flash memory 220) and execute the instructions to provide the features described below.

The instructions thus executed by processing block 210, may cause the configuration data to be managed according to several aspects of the present invention, as described below with examples.

4. Management of Configuration Data

Figure 3:
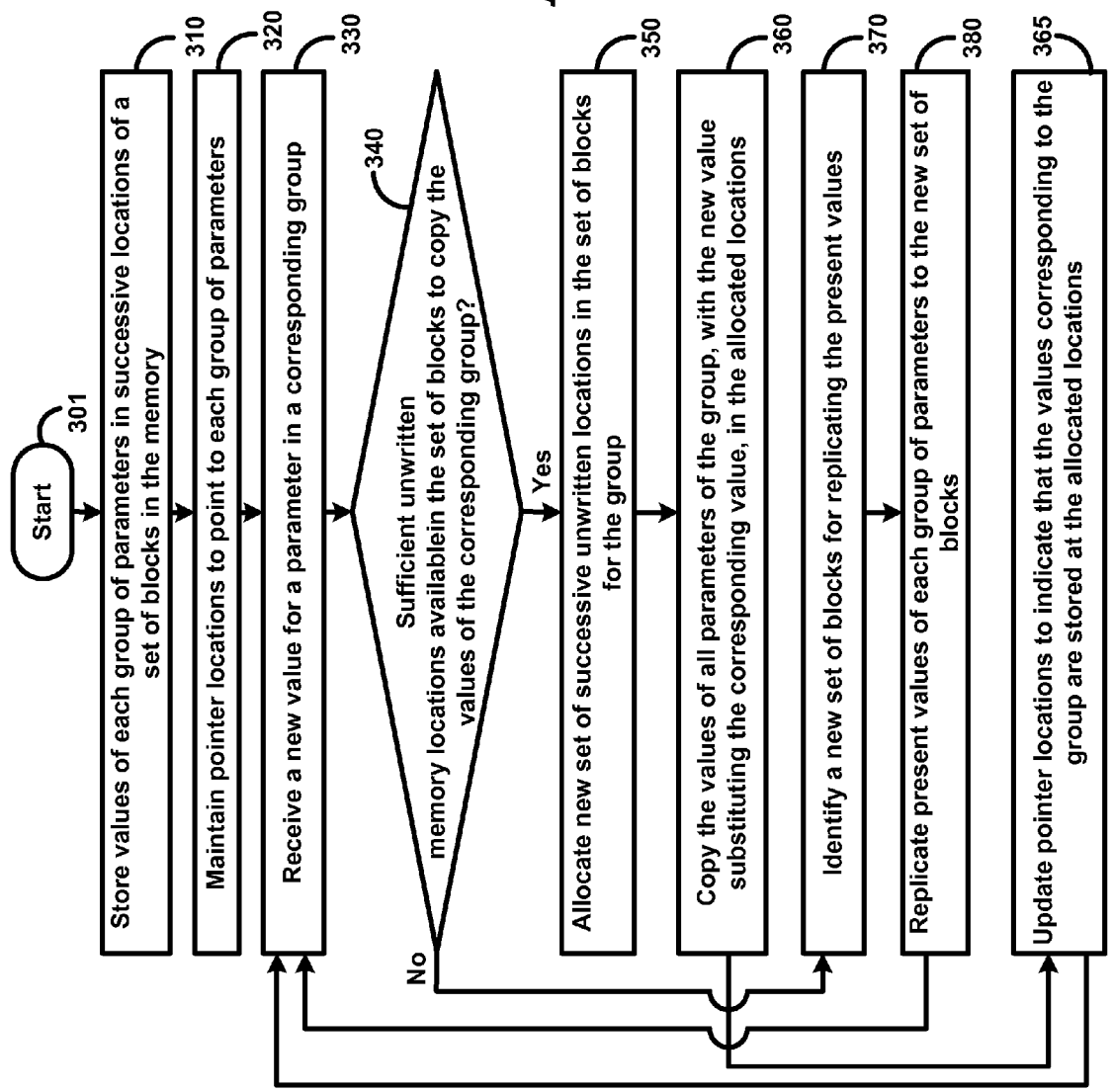
FIG. 3 is a flow chart illustrating the manner in which configuration data is managed in a memory requiring erasure of an entire block before a memory location in the block is rewritten.

FIG. 3 is a flowchart illustrating the manner in which configuration data is managed, in an embodiment of the present invention. The flowchart is described with respect to the environment of FIG. 1, and in relation to sensor device 200 of FIG. 2, merely for illustration. However, various features described herein can be implemented in other environments and using other components, as will be apparent to one skilled in the relevant arts by reading the disclosure provided herein.

Further, the steps in the flowchart are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein. The flowchart starts in step 301, in which control passes immediately to step 310.

In step 310, processing block 210 stores values of each group of parameters in successive locations of a set of blocks in the memory. Thus, in the illustrative examples noted above, the parameters corresponding to network communication (e.g., IP addresses of either self or of the access point 110F, buffer characteristics, retransmit timeout, etc.) may be treated as one group, the parameters corresponding to power management may be treated as another group, etc. In general, the parameters may be grouped according to any criteria, as suited by the developers designing the configuration data management approach.

Further, the association between parameters and the corresponding values can be according to any convention consistent with the implementation within the program logic underlying the configuration management approach. For example, each parameter may be identified by an appropriate identifier/label, and such identifier may be stored along with the corresponding value in the memory. Alternatively, the values may be stored in a pre-specified order and the program logic (accessing the parameter values) may also be implemented consistently. Also, the memory locations in which the values for each group stored are successive, implying that the memory addresses are consecutive.

In addition, any number of blocks can be included in the set of blocks, depending on the requirements of the corresponding situation. In general, as more data needs to be stored, more number of blocks may be used. On other hand, fewer blocks may be included if each block contains more locations. In the illustrative examples below, only a single block is deemed to be used for the set of blocks, though in an alternative embodiment two blocks together in view of the size of the configuration data. Control then passes to step 320.

In step 320, processing block 210 maintains pointer locations to point to each group of parameters. It should be appreciated that the pointer can point to any of the locations storing the information related to the group of parameters, according to a pre-specified convention. Example convention is described in sections below for illustration. In particular, though the pointer there is shown to point to the earliest location in the storage order, the pointer can point to other locations (e.g., the last location in the storage order). The earliest and last locations may be viewed as being first in the corresponding order. Control then passes to step 330.

In step 330, processing block 210 receives a new value for a parameter in a corresponding group. The new value may be received, for example, in a command via receive block 280 and antenna 295. In addition, new values may be received on simple wired interfaces also, for example, when a user changes values manually. Control then passes to step 340.

In step 340, processing block 210 checks whether sufficient unwritten memory locations are available in the set of blocks to copy the values of the corresponding group. 'Unwritten' signifies memory locations in the block that have not been written to, or have been written but erased earlier. In an embodiment (and as also consistent with typical flash memory implementations), an 'unwritten' location of flash memory 220 has all bits set to logic high. Control passes to step 350 if processing block 210 determines that unwritten free space in the block is available to store the first set with the changed value, and to step 370 otherwise.

In step 350, processing block 210 allocates new set of successive unwritten locations in the set of blocks for the group. Thus, any set of memory locations, which are available for writing, can be allocated consistent with the overall implementation. However, in an embodiment described below, the new set of successive unwritten locations immediately follows the previously allocated successive memory locations for all the groups. Control then passes to step 360.

In step 360, processing block 210 copies the values of all parameters of the group, with the new value substituting the corresponding value, in the allocated locations. Control then passes to step 365.

In step 365, processing block 210 updates pointer locations to indicate that the values corresponding to the group are stored at the allocated locations. In an embodiment described below, the pointer locations are also stored within the same set of blocks, and thus a linked list is maintained, with the tail of the linked list indicating the present valid values for the group of parameters. Control then passes to step 330.

In step 370 (when sufficient unwritten memory locations are unavailable), processing block 210 identifies a new set of blocks for replicating the present values. While flash memory 220 may have many blocks, any set of blocks, with unwritten memory locations, may be chosen. In an embodiment described below, only two sets of blocks are used, with one set of blocks being erased after the data is copied to the other set. Control then passes to step 380.

In step 380, processing block 210 replicates present values of all groups of parameters to the new set of blocks. Replication entails copying the present value (reflecting all updated values) of groups of parameters to the new set of blocks. Such replication may be consistent with the conventions used in steps 310 and 320. Control then passes to step 330.

Thus, the approaches of FIG. 3 can be used to manage configuration data (in the form multiple groups of parameters), given the constraint that the memory locations cannot be rewritten until erased. Some features of the present invention make such erasure also more susceptible to recovery in case of power failures. The approaches are further illustrated with examples below.

5. Example

FIG. 4A illustrates the information stored in a memory block 400 for management of configuration data, in one embodiment. Status 401 is shown set to 10 to indicate that the block is active and has been used for storing data. When no locations of a block are used for storing data (including after erasure), status 401 is set to 11 (the default state of each bit after erasure, in an embodiment).

Group pointers 410 contain a start pointer for each of the groups of parameters. Thus, there are shown four start pointers, respectively pointing to the first location from which the information for the corresponding group is stored. Location 402 is accordingly shown pointing to location 403, the first memory location from which the information corresponding to the first group is stored.

Area 406 contains memory locations storing the information corresponding to a parameter group. First location 403 is shown containing a pointer, which is set to FFFF (the default state after erasure) to indicate that area 406 stores the valid values for the group. As described below, when the values are replicated to a new area, the pointer is modified to point to the new area at which the next set (after a change) of valid values are stored.

First location 403 also contains a size field, which stores the number of locations storing the values for the parameters for the present group. Thus, size in location 403 may be set to 2 to indicate only two locations are shown used. Each location is shown storing the value corresponding to one parameter, for ease of understanding.

The information corresponding to the remaining three groups also is similarly described and is not repeated for conciseness. It should be appreciated that each group would typically contain many more parameters though only 1-3 are shown for illustration. Similarly, the configuration data may be organized as a different number of groups, consistent with the implementation of the program logic accessing the parameters.

Free space 420 represents the unwritten memory locations in the memory block 400. In the illustrative embodiment, the memory locations storing the information corresponding to all groups (including space allocated later in case of updates) is in contiguous blocks (and thus successive locations), and thus free space 420 is shown as being formed successive memory locations.

Global free pointer 430 points to the first location of free space 420 and is stored in RTC 240 in one embodiment. It should be noted that when the data in memory of RTC 240 is somehow lost (due to power failure or removal of battery or some other faulty conditions), global free pointer 430 may not point to correct location. However, the location can be ascertained with reasonable accuracy according to an approach wherein, the size field in the first location of each group (starting from location 403) is used to identify the start location of the next group iteratively until a value 0xFFFF is encountered for the size field. The corresponding location with 0xFFFF for the group field be concluded to be the start of the unwritten locations.

Global free pointer 430 is updated when a value of a parameter is changed (or configuration data for a group is changed, in general), as described below with respect to FIG. 4B. It is assumed that a command is received to change the value of the parameter corresponding to location 404, and the status of the memory block 400 after the change is stored, is depicted in FIG. 4B.

6. Changing Value of a Parameter

FIG. 4B illustrates the information stored in memory block 400 after a parameter (in the first group of area 406) is set to a new value. Area 440 represents the memory locations allocated for replicating the values corresponding to the first group (after a new value for first parameter 404 has been received). Global free pointer 430 is accordingly shown pointing to the location following area 440.

Area 440 is shown containing the same values for the remaining parameters, except that the new value CFG_PARAM_1a' is substituted for CFG_PARAM_1a of location 404. Thus, the same values of area 406 are replicated/copied into area 440, except that the new values of any parameters are substituted for old values.

Pointer in location 403 is set to (0x0010), indicating that area 440 starts from memory location with address 16. Since the pointer is set to a value other than FFFF, it is interpreted that area 406 has invalid data. Pointer in location 431 is shown having a value of 0xFFFF indicating that the corresponding area stores valid values for the group of parameters.

It is now assumed that the parameter corresponding to location 432 is to be changed and free space 445 does not have sufficient unwritten memory locations to replicate the values corresponding to the third group (after a new value for third parameter 432 has been received). In this case, the values corresponding to all the groups of memory block 400 will be replicated in a new memory block 450 (within flash memory 220), with the value of the third parameter 432 changed to the new value, is depicted in FIG. 4C.

7. Replicating Values in a New Block

FIG. 4C depicts the content of a new block after there is insufficient memory space to store changed values in the block of FIG. 4B. The last of locations corresponding to each group in FIG. 4B are shown copied into block 450. For example, values in area 440 are shown copied to area 457. Values corresponding to the third group are shown in area 464, with the new value CFG_PARAM-3c' replacing old value CFG_PARAM-3c of FIG. 4B. Status 401 is shown set to 01 to indicate that the block is active and has been used for storing data.

In addition, each location of group pointers 456 is shown pointing to the area where the values of corresponding group are stored, consistent with the convention in FIG. 4A.

According to an aspect of the present invention, block 400 is erased only after copying to block 450 is complete. Since erasure of a block generally causes substantial overhead, the erasure may be deferred at least until such time as when it can be ascertained that the erasure is actually required for rewriting of the block. Such management approach leads to enhanced reliability in the management of configuration data (as well avoidance of unneeded overhead), as described below.

8. Reduced Susceptibility to Power Failures

One general problem with configuration management using flash memories is that power failure during the copying/erasure operations can lead to unpredictable state, from which acceptable recoveries may not be possible. By using multiple sets of blocks (400 and 450) and erasing block 400 after copying is complete to block 450, the probability of such state is substantially reduced since the content of block 400 is preserved and utmost only the information on the last update causing the switch to block 450 would be lost, in case of failure during the processing of the update command.

FIG. 4D depicts the status of block 400 once such erasing is performed. The status in location 401 is shown set to 11 to indicate that no further data is written into block 400, and can be used for configuration management. The general use of status field is described below in further detail.

Each block is shown containing a two bits of status field (equaling a number of blocks used, here two). When a block is erased, the bit values are set to all 1s (here, 11). Blocks 400 and 450 may be viewed as the first block and the second block. When the first block is in use (i.e., as shown in FIGS. 4A and 4B), the status field (for the first block) there is shown set to 10 (while the status field for the second block is shown continued with 11).

When the first block does not have sufficient number of locations to store the changed values for a group, the present values are first copied to the second block. After copying is completed, the status of the first block is first set to 00 (not shown in the diagram), which indicates that the valid data is now in the second block. The status of the second block is thereafter set to 01 (indicating that the second block is active). There is a relatively short span of time between the changes of the two status fields and thus the approach may be less susceptible to power failure type disruptions.

Even if there is a failure between the two status changes, the value 00 for the first block indicates that the active block is the second block, and the status field can be set during later power-up.

While the approach above has been described with respect to two blocks for illustration, more blocks can be used as well, without departing from several aspects of the present invention.

Thus, once unwritten memory locations become unavailable in block 450 of FIG. 4C (after several update operations), block 400 can be used to copy the valid locations and continue management of the configuration data.

9. Conclusion

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A computer readable medium to store one or more sequences of instructions for causing a device to manage configuration data in a memory formed as a plurality of blocks, each block containing multiple memory locations for storing data, each block requiring erasing of stored data in all the memory locations of the block before rewriting of new data into any memory location of the same block, wherein the memory locations of each block can be rewritten without having to rewrite the memory locations of any of the other blocks, wherein execution of said one or more sequences of instructions by one or more processors contained in said device causes said one or more processors to perform the actions of:

storing a first set of values representing configuration data in a first set of blocks comprised in said plurality of blocks, wherein said configuration data is organized in the form of a plurality of groups, wherein the configuration data corresponding to all the groups is written in consecutive memory locations of said first set of blocks, with the configuration data corresponding to each group being stored in consecutive memory locations;

receiving a new value to be stored for a first parameter in a first group contained in said plurality of groups;

checking whether sufficient unwritten memory locations are present in said first set of blocks to write configuration data corresponding to said first group, including said new value for said first parameter;

if sufficient unwritten memory locations are determined to be present in said first set of blocks, storing the configuration data corresponding to said first group, including said new value for said first parameter, in the unwritten memory locations of said first set of blocks; and if sufficient unwritten memory locations are determined not to be present in said first set of blocks, replicating said configuration data in said first set of blocks, with said new value for said first parameter, to a second set of blocks, and erasing said first set of blocks after completing said replicating.

2. The computer readable medium of claim 1, wherein said memory is a flash memory.

3. The computer readable medium of claim 1, wherein said erasing of said first set of blocks is delayed until new unwritten memory locations are required for storing of said configuration data, wherein memory locations of said first set of blocks are provided, after erasing, as said required new unwritten memory locations.

4. The computer readable medium of claim 3, wherein the configuration data corresponding to each of said plurality of groups starts from a corresponding memory location, said one or more instructions further for:

setting each of a set of pointer locations to point to a start memory location from which the configuration data of the corresponding group is stored;

maintaining a global free pointer which points to start of next available unwritten memory locations in said memory, wherein said checking uses said global free pointer to determine whether sufficient unwritten memory locations are present starting from the location pointed to by said global free pointer, wherein said set of pointer locations and said global free pointer are updated upon said replicating.

5. The computer readable medium of claim 4, further comprising:

associating a respective status bit for each of said plurality of groups, wherein said status bit is set to a first value to indicate that the corresponding stored values are valid and set to a second value to indicate that the corresponding stored values are invalid, wherein the status bit of said first group in said first set of blocks is set to said first value before said replication, and to said second value in a duration between said replication and said erasing, wherein said first value corresponds to a default state of the memory location after erasure.

6. The computer readable medium of claim 5, further comprising:

associating a local pointer to each of said plurality of groups stored in said memory;

setting said local pointer to said default value when the configuration data corresponding to the group is valid, and modified to point to the starting location of the configuration data in said second set of blocks upon said replicating.

7. A method for managing configuration data in a memory formed as a plurality of blocks, each block containing multiple memory locations for storing data, each block requiring erasing of stored data in all the memory locations of the block before rewriting of new data into any memory location of the same block, wherein the memory locations of each block can be rewritten without having to rewrite the memory locations of any of the other blocks, said method comprising:

storing a first set of values representing configuration data in a first set of blocks comprised in said plurality of blocks, wherein said configuration data is organized in the form of a plurality of groups, wherein the configuration data corresponding to all the groups is written in consecutive memory locations of said first set of blocks, with the configuration data corresponding to each group being stored in consecutive memory locations;

receiving a new value to be stored for a first parameter in a first group contained in said plurality of groups;

checking whether sufficient unwritten memory locations are present in said first set of blocks to write configuration data corresponding to said first group, including said new value for said first parameter;

if sufficient unwritten memory locations are determined to be present in said first set of blocks, storing the configuration data corresponding to said first group, including said new value for said first parameter, in the unwritten memory locations of said first set of blocks; and if sufficient unwritten memory locations are determined not to be present in said first set of blocks, replicating said configuration data in said first set of blocks, with said new value for said first parameter, to a second set of blocks, and erasing said first set of blocks after completing said replicating.

8. The method of claim 7, wherein said memory is a flash memory.

9. The method of claim 7, wherein said erasing of said first set of blocks is delayed until new unwritten memory locations are required for storing of said configuration data, wherein memory locations of said first set of blocks are provided, after erasing, as said required new unwritten memory locations.

10. The method of claim 9, wherein the configuration data corresponding to each of said plurality of groups starts from a corresponding memory location, said method further comprising:

setting each of a set of pointer locations to point to a start memory location from which the configuration data of the corresponding group is stored; and maintaining a global free pointer which points to start of next available unwritten memory locations in said memory, wherein said checking uses said global free pointer to determine whether sufficient unwritten memory locations are present starting from the location pointed to by said global free pointer, wherein said set of pointer locations and said global free pointer are updated upon said replicating.

11. The method of claim 10, further comprising:

associating a respective status bit for each of said plurality of groups, wherein said status bit is set to a first value to indicate that the corresponding stored values are valid and set to a second value to indicate that the corresponding stored values are invalid, wherein the status bit of said first group in said first set of blocks is set to said first value before said replication, and to said second value in a duration between said replication and said erasing, wherein said first value corresponds to a default state of the memory location after erasure.

12. The method of claim 11, further comprising:

associating a local pointer to each of said plurality of groups stored in said memory;

setting said local pointer to said default value when the configuration data corresponding to the group is valid, and modified to point to the starting location of the configuration data in said second set of blocks upon said replicating.

13. A system comprising:

a storage containing locations which are accessible randomly;

one or more processors to retrieve instructions from said storage and execute the retrieved instructions, wherein execution of said retrieved instructions causes said system to perform the actions of:

storing a first set of values representing configuration data in a first set of blocks comprised in a plurality of blocks in a memory, each block requiring erasing of stored data in all the memory locations of the block before rewriting of new data into any memory location of the same block, wherein the memory locations of each block can be rewritten without having to rewrite the memory locations of any of the other blocks, wherein said configuration data is organized in the form of a plurality of groups, wherein the configuration data corresponding to all the groups is written in consecutive memory locations of said first set of blocks, with the configuration data corresponding to each group being stored in consecutive memory locations;

receiving a new value to be stored for a first parameter in a first group contained in said plurality of groups;

checking whether sufficient unwritten memory locations are present in said first set of blocks to write configuration data corresponding to said first group, including said new value for said first parameter;

if sufficient unwritten memory locations are determined to be present in said first set of blocks, storing the configuration data corresponding to said first group, including said new value for said first parameter, in the unwritten memory locations of said first set of blocks; and if sufficient unwritten memory locations are determined not to be present in said first set of blocks, replicating said configuration data in said first set of blocks, with said new value for said first parameter, to a second set of blocks, and erasing said first set of blocks after completing said replicating.

14. The system of claim 13, wherein said memory is a flash memory.

15. The system of claim 12, wherein said erasing of said first set of blocks is delayed until new unwritten memory locations are required for storing of said configuration data, wherein memory locations of said first set of blocks are provided, after erasing, as said required new unwritten memory locations.

16. The system of claim 15, wherein the configuration data corresponding to each of said plurality of groups starts from a corresponding memory location, said method further comprising:

setting each of a set of pointer locations to point to a start memory location from which the configuration data of the corresponding group is stored; and maintaining a global free pointer which points to start of next available unwritten memory locations in said memory, wherein said checking uses said global free pointer to determine whether sufficient unwritten memory locations are present starting from the location pointed to by said global free pointer, wherein said set of pointer locations and said global free pointer are updated upon said replicating.

17. The system of claim 16, wherein said retrieved instructions further cause said system to perform the actions of:

associating a respective status bit for each of said plurality of groups, wherein said status bit is set to a first value to indicate that the corresponding stored values are valid and set to a second value to indicate that the corresponding stored values are invalid, wherein the status bit of said first group in said first set of blocks is set to said first value before said replication, and to said second value in a duration between said replication and said erasing, wherein said first value corresponds to a default state of the memory location after erasure.

18. The system of claim 17, wherein said retrieved instructions further cause said system to perform the actions of:

associating a local pointer to each of said plurality of groups stored in said memory;

setting said local pointer to said default value when the configuration data corresponding to the group is valid, and modified to point to the starting location of the configuration data in said second set of blocks upon said replicating.

* * * * *